Sept. 24, 1929.          C. W. ROBINSON ET AL          1,729,087
                              HARROW
                       Filed Dec. 11, 1926           2 Sheets-Sheet 1
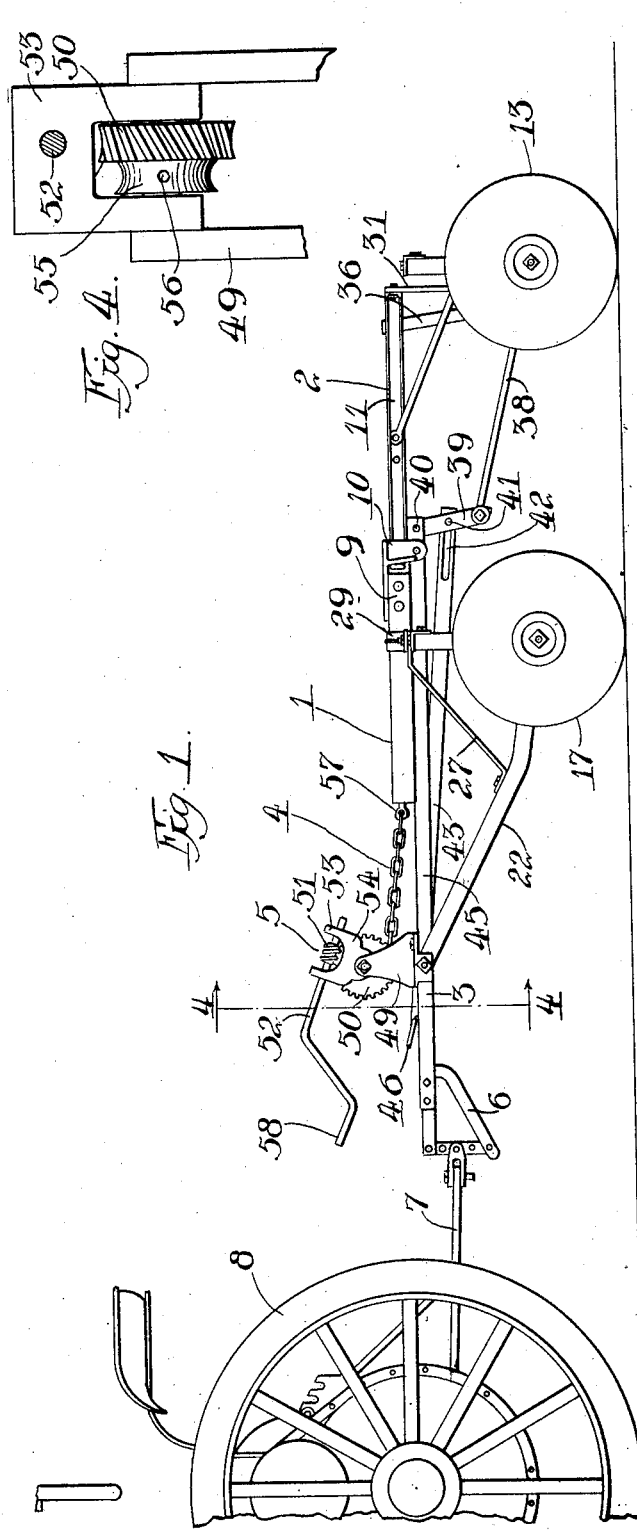
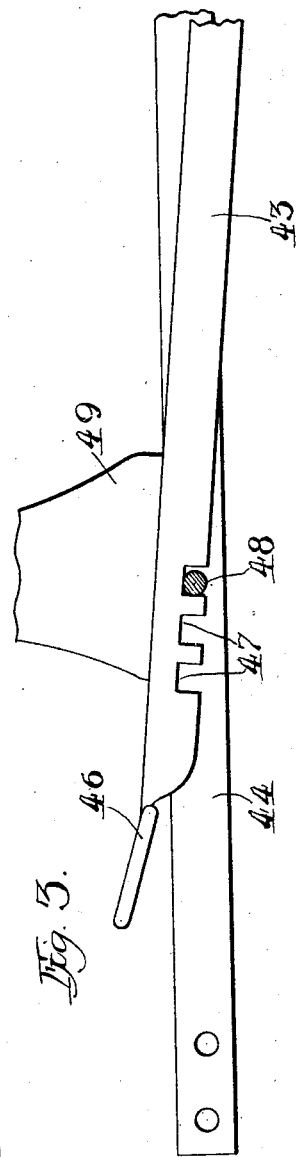
Inventors,
Charles W. Robinson,
William C. Dwyer,
By
Atty.

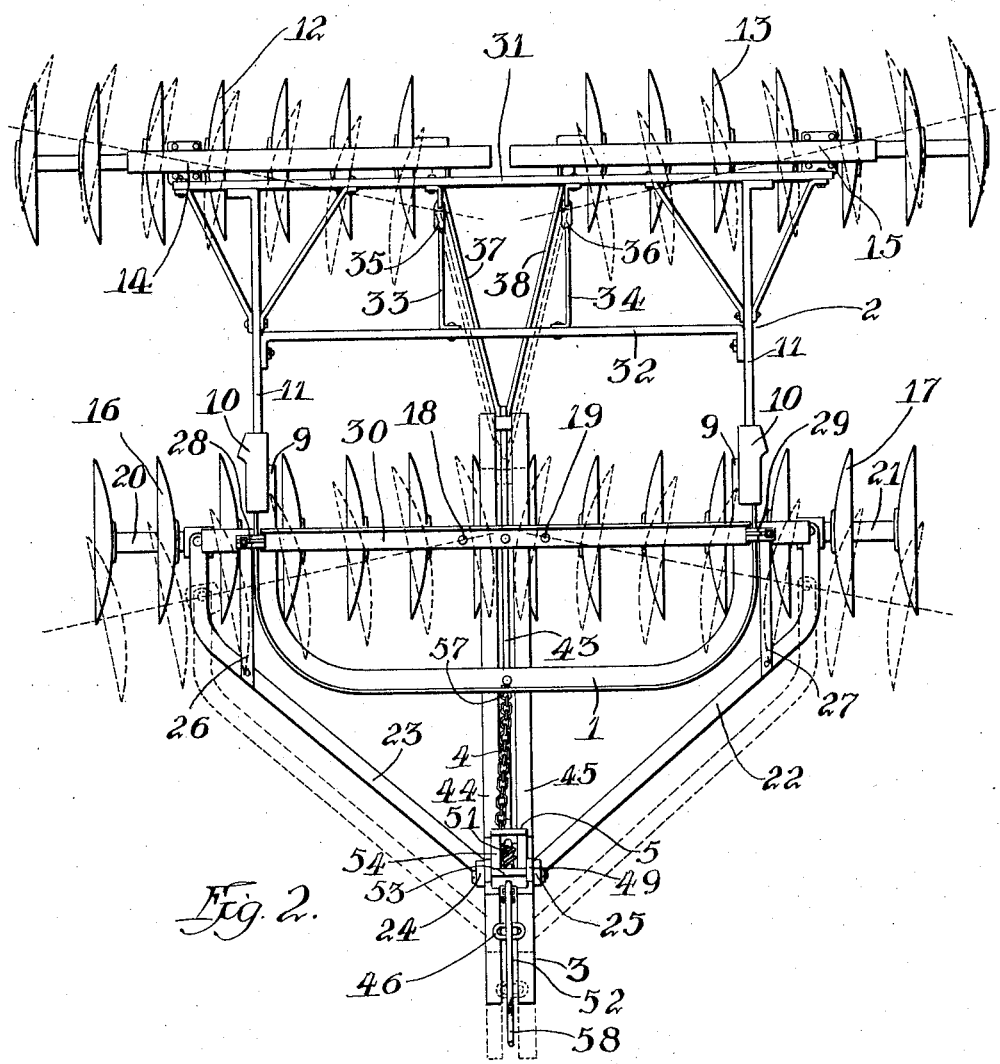

Patented Sept. 24, 1929

1,729,087

UNITED STATES PATENT OFFICE

CHARLES W. ROBINSON, OF HAMILTON, ONTARIO, CANADA, AND WILLIAM C. DWYER, OF AUBURN, NEW YORK, ASSIGNORS TO INTERNATIONAL HARVESTER COMPANY, OF CHICAGO, ILLINOIS, A CORPORATION OF NEW JERSEY

HARROW

Application filed December 11, 1926. Serial No. 154,049.

This invention relates to earth working implements and more particularly to improvements in a disk harrow whereby the angling and the straightening of the gangs may be advantageously controlled by a novel mechanism.

It is an object of the invention to provide a novel and practical disk harrow construction advantageously adapted for operation by a tractor.

Another object of the invention is to provide novel means for enabling the angling and straightening of the disk gangs to be under the manual control of the operator.

A further object of the invention is to provide a tandem disk harrow having front and rear frames, a draft beam slidable with respect to said frames, and a manually governed, flexible connection acting as improved controlling means and located so as to connect the frames with the tongue member.

Further objects of the invention will appear as the following description progresses.

A preferred embodiment of the invention is shown in the accompanying drawings, in which—

Figure 1 is a side elevation of the illustrative harrow;

Figure 2 is a plan illustrating the angled positions of the gangs in dotted lines;

Figure 3 is a detail view illustrating the improved construction for varying the limits of the angling movements of the rear gangs; and Figure 4 is a detail view of the control mechanism.

The Figures 1 and 2 of the drawings show a harrow comprising a front frame section 1, preferably flexibly connected to a rear frame section 2. A draft beam 3 is slidably related to the frame sections and is shown as adjustably connected thereto by means of a flexible connection 4. By the operation of a control mechanism 5, the connection 4 is acted upon to change the positions of the disk gangs or to permit the disk gangs to move into different positions by action of the draft, as will be hereinafter indicated.

As illustrated in the drawings, the front end of the draft beam 3 is provided with a draft device 6 connected by a hitch bar 7 with a tractor generally indicated at 8. The draft beam construction preferably comprises parallel angle bars 44 and 45 and extends centrally longitudinally of the improved harrow and is movably related to the front frame section 1. This frame section is shown as comprising a yoke or U-shaped member having rearwardly extending legs 9 preferably connected by means of flexible connections 10 to the forwardly extending legs of the rear frame section 2.

The rear disk gangs 12 and 13 are illustrated as being pivotally connected at positions 14 and 15, respectively, to the rear frame section 2. The positions of such pivotal connections are preferably intermediate the ends of the rear gangs. The front disk gang sections 16 and 17 are pivotally associated with the front frame 1 at positions 18 and 19, respectively, which are adjacent the inner ends of the front gangs.

Pivotally connected to the axles 20 and 21 of the front disk gangs are converging draft bars 22 and 23. These bars extend forwardly and are preferably connected to the tongue construction 3 at positions 24 and 25. It will be apparent from this disclosure that the outer ends of the front gangs will move backward or forward with the draft bars 22 and 23 and with the draft beam 3.

Connecting bars 26 and 27 are located near the outer ends of the draft bars 22 and 23 and are so positioned as to extend rearwardly from parts of the draft bars about the disk gangs. As shown, they extend to guides 28 and 29 which are secured to the front disk gangs and so located as to overlap the rearwardly extending legs 9 of the front frame.

The U-shaped member of the front frame has its legs 9 connected by a crossbar 30 which preferably carries pivot members associating the forward gangs with the front frame section at the positions 18 and 19. Constant proper operative relationship between the draft beam 3 and the front frame section 1 is promoted by guides which prevent the draft beam from moving out of its position of sliding relationship to the frame section 1. The rear frame section preferably comprises transverse bars 31 and 32 connected at their ends by the legs 11 and having fore and aft connections 33 and 34 adjacent the center of the rear frame section. Preferably slidably mounted upon the connections 33 and 34 are adjustable hangers 35 and 36 which preferably have looped upper ends encircling the connections 33 and 34. The hangers 35 and 36 depend from the connections 33 and 34 so as to maintain the inner ends of the rear disk gangs 13 in the desired operative positions. The hangers are preferably pivotally connected at their lower ends with forwardly extending angling bars 37 and 38. These bars are pivotally associated with the inner ends of the rear gangs and are shown in the drawings as pivotally connected at their forward ends to a lever 39 pivotally connected at 40 to the angle bars 44 and 45.

For the purpose of providing an adjustable stop for desirably controlling the angling movement of the rear gangs, the lever 39 is provided intermediate its ends with a stop 41 preferably movable within a slot 42 in a limit rod 43. This rod preferably extends in a fore and aft direction and upwardly between the angles 44 and 45 of the draft beam 3, and is provided at its forward end with a handle 46. Figure 3 illustrates the manner in which the limit rod 43 is adjustable with relation to the draft beam for the purpose of limiting the angling movement of the rear gangs. As here shown the limit rod is provided with a series of notches 47 for engagement with and reception of a stop 48 preferably extending across the draft beam 3 and secured to the angles 44 and 45. Forward adjustment of rod 43 increases the working angle of the rear gangs.

The control indicated by the numeral 5 comprises a pedestal 49 preferably rigidly secured to the draft beam 3. Rotatably journaled at the upper ends of the pedestal is a driven gear 50 meshing with a driving gear 51, preferably fixed upon a manually operated shaft 52. The shaft 52 is journaled in the arms 53 of a bracket 54 preferably adjustably mounted at the upper end of the pedestal 49. At one side of the driven gear 50, a sheave 55 is mounted and preferably non-rotatively connected with the gear. A flexible connection, herein shown as a chain 4 is fixedly connected to the sheave 55 at a point illustrated at 56. The rear end of the chain 4 is fixedly connected to a midportion of the front frame section 1, as indicated at 57.

Assuming that the disk gangs are in the positions indicated by the full lines in Figure 2 of the drawings and assuming that the illustrative harrow is connected to a tractor, as illustrated in Figure 1 of the drawings, the gangs are in such positions that the harrow may be transported without performing any soil working results. The gangs are then in what is termed "straightened condition."

Before the harrow may be set to work in the field, the gangs must be angled so that they assume positions such as those indicated by the dotted lines indicated in Figure 2 of the drawings. When the operator wishes to bring the gangs to these angled positions, he may grasp the handle 58 and so turn the sheave 55 that the connection 4 will be unwound from the sheave. If this is done while the tractor is proceeding forwardly, the draft beam 3 will move forwardly with the tractor and move forwardly relative to the front and rear frame sections 1 and 2, thus positively pulling the outer ends of the front gangs forwardly and the inner ends of the rear gangs forwardly and bringing the gangs into operative position.

The operator may also rotate the sheave 55 while the tractor and harrow are standing still. Assuming the parts to be in the positions in which they are shown in Figure 1 of the drawings, and the harrow to be standing still, if the operator turns the driven gear 50 in a counter-clockwise direction, the flexible connection 4 will be loosened so that considerable slack will develop. Thereafter when the tractor is started forwardly, the draft beam 3 will be moved forwardly, causing the gangs to assume their angled positions, as are indicated in Figure 2 of the drawings.

While the invention has been described with reference to a particular construction, it is to be understood that it is not limited thereto but that it is capable of use in various combinations and sub-combinations as may be required by the demands of actual practice, within the scope of the appended claims.

What is claimed is:

1. In a tandem disk harrow, connected front and rear frame sections, a pair of disk gangs pivoted to the front section near their inner ends, a pair of disk gangs pivoted intermediate their ends to the rear section, a draft beam structure slidably related to the front section, means pivotally connecting the draft beam structure with the front gangs near their outer ends, means pivotally connecting the inner ends of the rear gangs with the draft beam structure, and means for adjustably connecting the draft beam structure and the front section, said means comprising worm gearing and a flexible element.

2. In a tandem disk harrow, front and rear frame sections, a pair of disk gangs pivoted to the front section near their inner ends, a pair of disk gangs pivoted intermediate their ends to the rear section, a draft beam slidably related to the front section, rearwardly diverging bars pivotally connecting the draft beam with the front gangs near their outer ends, means pivotally connecting the inner ends of the rear gangs with the draft beam, and means for adjustably connecting the draft beam and the front section, said means comprising gearing and a flexible element.

3. A disk harrow comprising, in combination, front disk gangs, rear disk gangs, a front frame pivotally connected to the inner ends of the front gangs, a rear frame pivotally connected to the rear gangs at points intermediate the length of the latter and flexibly connected with the front frame, a centrally located draft beam structure supported by the front frame adjacent the inner ends of the front gangs and slidably associated with the front frame, means for connecting the forward end of the draft beam structure with the outer ends of the front gangs, means for connecting the rearward end of the draft beam structure with the inner ends of the rear gangs, a chain connecting the front frame and the draft beam structure, and gear actuated means on the draft beam for altering the effective length of the chain.

4. A disk harrow comprising, in combination, front disk gangs, rear disk gangs, a front frame pivotally connected to the inner ends of the front gangs, a rear frame pivotally connected to the rear gangs at points intermediate the length of the latter and flexibly connected with the front frame, a centrally located draft beam structure supported by the front frame adjacent the inner ends of the front gangs and slidably associated with the front frame, means for connecting the forward end of the draft beam structure with the outer ends of the front gangs, means for connecting the rearward end of the draft beam structure with the inner ends of the rear gangs, a winding drum mounted on the forward portion of the draft beam structure, a flexible element connecting the front frame to the winding drum, and means for rotating the drum including an actuating member extending towards the forward end of the draft beam structure.

5. In a tractor disk harrow, the combination of connected front and rear sections, a pair of disk gangs pivoted to the front section near their inner ends, a pair of disk gangs pivoted intermediate their ends to the rear section, a central draft beam slidable longitudinally on the front section, means pivotally connecting the forward portion of the draft beam with the outer portions of the front gangs, links pivotally connecting the inner ends of the rear gangs with a movable pivot on the rear end of the draft beam, and means for adjusting the pivot connection of said links to the beam in a fore and aft direction comprising an adjusting element carried by the draft beam and extending to a point adjacent the forward end of the beam.

In testimony whereof we affix our signatures.

CHARLES W. ROBINSON.
WILLIAM C. DWYER.